Sept. 2, 1969  C. W. HITCHCOCK  3,464,228

WATER KEG ICER

Filed May 6, 1968

INVENTOR
CHARLES W. HITCHCOCK

BY
ATTORNEYS

United States Patent Office 3,464,228
Patented Sept. 2, 1969

3,464,228
WATER KEG ICER
Charles W. Hitchcock, Rte. 5, Box 110,
Lake City, Fla. 32055
Filed May 6, 1968, Ser. No. 726,907
Int. Cl. F25c 5/10; B67d 5/62; F25d 19/02
U.S. Cl. 62—352                                9 Claims

ABSTRACT OF THE DISCLOSURE

Apparatus and method for cooling water or other potable liquid for human consumption or for cooling or producing temperature change of any other substance for any other purpose utilizing one or more insulated kegs or containers and one or more refrigeration elements with water or other potable liquid until freezing has occurred or the desired temperature has been obtained, whereupon the temperature of each refrigeration element is raised sufficiently to free it from any accumulation of ice and allow its removal from the keg or container with the latter placed in any desired location for continued refrigeration of its contents, each refrigeration element being in the general form of an open bottom hollow wall cylinder with relatively smooth continuous inner and outer surfaces which produce the temperature change subject to suitable controls including the formation of ice around and within the coil in the bottom of the container and upwardly, interiorly and exteriorly of the coil.

Background of the invention

*Field of the invention.*—This invention relates to the refrigeration of water or other potable liquid or other substance for any purpose and particularly the use of a refrigeration system with a refrigeration element for obtaining the desired temperature in a container after which the refrigeration element may be heated to free it from any ice formed thereon, and it is then removed and the contents of the container used as desired.

*Description of the prior art.*—It is old to supply refrigerated matter such as cold drinking water to workmen for their comfort and convenience, including during hot weather. It is customary to supply such cold water or other substance from a central location in containers which can be easily transported from one location to another in order to minimize loss of time and expenditure of effort. Keeping the water or other potable liquid or other substance in such containers cool has presented a problem since ice melts due to heat and at times due to variations in weather temperature the amount consumed may be greater than at other times so that the supply is reduced to exhaustion during parts of the day. If a keg or container is provided with ice in blocks or in smaller particles size, considerable voids will exist normally filled with warm water or other medium which accelerates thawing of the ice, particularly in view of the fact that the surface area of the small particles is greater than that of larger blocks of ice. Also where it is necessary to chip the ice, labor is involved adding expense as well as the risk of contamination.

Objects of the invention

It is an object of the invention to provide apparatus and method for producing the desired temperature within a container, for example, a unitary cake of ice which will substantially fill such container and which can be used to cool water or other potable liquid or other substance, as well as to provide a keg or container and refrigeration apparatus with a removable unit for producing the desired temperature in such container.

Another object of the invention is to provide apparatus and method for supplying ice water or other potable liquid or other substance in an insulated keg or container utilizing a refrigeration system with an element which can be removably disposed in the keg or container long enough to produce the desired refrigerating effect including ice and thereafter the temperature raised to free and allow the removal of the refrigeration element from the ice and the subsequent disposition of the container with or without the refrigeration element with its contents in any desired location with the insulation causing the temperature to remain near constant for a substantial period and resulting in the ice melting slowly and the contents of the container available at refrigerated temperature for a much longer period.

Another object of the invention is to provide apparatus and method for providing refrigeration of matter including drinking water or other potable liquid or other matter in abundant quantities at relatively low cost and distributable at minimum expense, and in which the amount of ice and the melting of the same can be controlled.

Other objetcs and advantages of the invention will be apparent from the following description considered in conjunction with the accompanying drawing:

SUMMARY OF THE INVENTION

Figure 1:
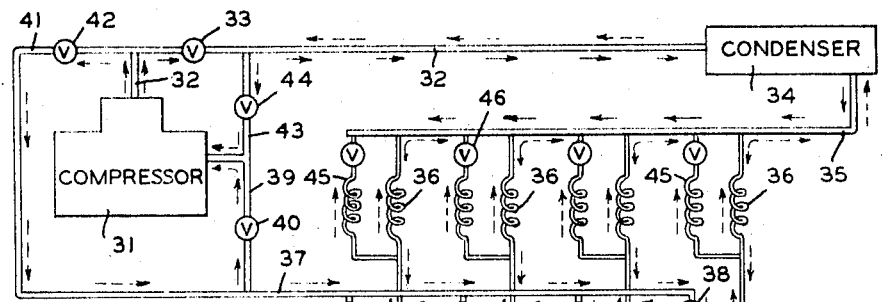
FIG. 1 is a layout of a refrigeration system for refrigerating multiple kegs or containers for ice water.
Figure 6:
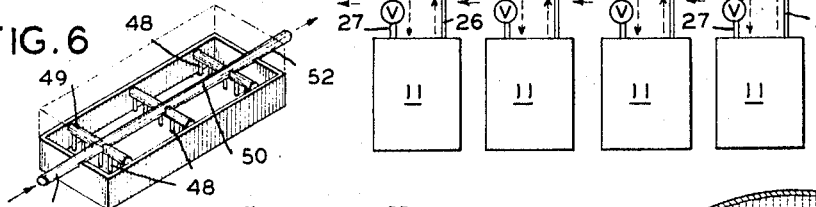
FIGURE 6 shows a perspective view of a modified freezing arrangement providing multiple freezing means.
Figure 3:
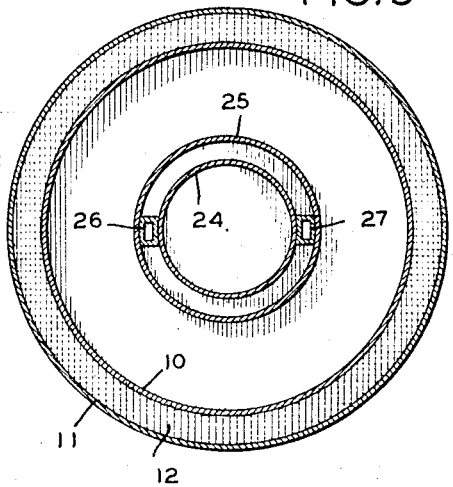
FIG. 3, a horizontal section illustrating the inlet to and outlet from the coil.
Figure 2:
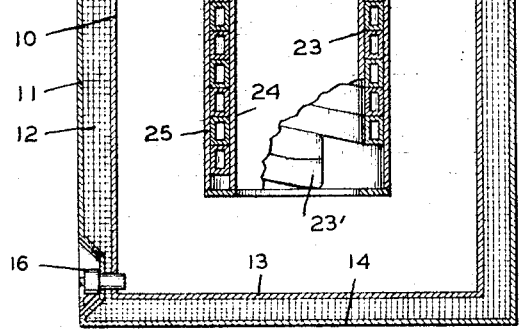
FIG. 2, a vertical section through one of these four illustrated kegs or containers with the refrigerating coil therein, the coil having flat sides so that it may be used with or without inner and outer sleeves between which the coil is located.
Figure 5:
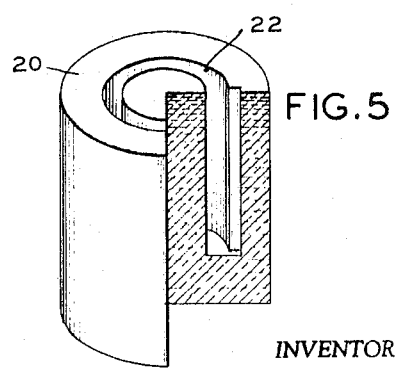
FIG. 5, a perspective partly in section of a cake of ice formed in the keg or container.

The invention is directed to apparatus and method for providing the desired temperature of a substance such as cold drinking water or other potable liquid in a keg or container utilizing a refrigeration system having at least one element which can be removably disposed in the keg or container with water or other potable liquid to cause the same to congeal or freeze, or with any other matter for any other use, and thereafter the temperature of the element raised to free it from the congealed product and permit its removal leaving the container filled with refrigerated substance such as a solid cake of ice or congealed liquid. Such container is of sufficient size that can be readily transported and made available at any desired location. The refrigeration element is preferably in the general form of a refrigerating coil having smooth inner and outer surfaces to which the refrigerant is supplied to produce the refrigerating effect.

Description of the Preferred Embodiment

With continued reference to the drawing, a water keg or container is provided of spaced inner and outer cylinders 10 and 11 between which is located insulation 12. The inner and outer cylinders have bottoms 13 and 14, respectively, spaced apart to accommodate the insulation therebetween. The cylinders are connected at their upper ends by means of a cover ring or band 15. Also the keg or container preferably is provided with a tap or spigot 16 for the dispensing of water or other liquid. For convenience in handling and transporting the keg or container may have handles 17 at opposite sides and a cover 18 (FIG. 4) and may have a gripping portion or handle 19. Thus a substantially air tight insulated container is provided.

Figure 4:
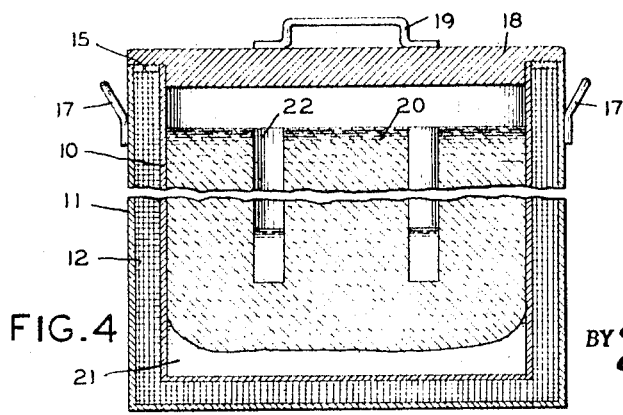
FIG. 4, a vertical section of one of the kegs or containers after the ice has been frozen therein, the coil heated to fill it, and then removed.

The keg or container is adapted to have ice 20 made therein for the cooling of liquid or other substance and when the ice melts, the liquid 21 may be dispensed through the tap 16. As illustrated in FIG. 4, the ice formed in a cake or block within the keg has an annular opening 22 caused by the refrigerating coil being heated and removed.

The refrigerating coil may be composed of a tube 23, preferably rectangular in cross-section, with the turns in the coil so arranged that a smooth, continuous internal and external surface is provided so that water or other liquid is frozen thereon and the coil about which it is formed can be separated by the addition of heat to the coil. The coil may be formed of a tube with an inlet at one end and an outlet at the other and with the tube folded to provide parallel helical portions with the inlet and outlet at one end of the helix and the folded portion forming the joint 23' at the opposite end. Thus a cylinder is formed of uniform internal and external diameter in order not to interfere with ice removal on its interior and exterior.

The coil 23 may have, although the same are not necessary, inner and outer concentric sleeves 24 and 25 between which the turns of the coil are located. The coil inlet 26 is to receive liquid refrigerant and the coil outlet 27 is for the attachment of the suction line or discharge of the refrigerant after it has absorbed heat. One of the inlet and outlet is connected to each end of the coil and the other to the opposite end. While the tube 26 is described as the inlet and the tube 27 as the outlet, if desired the refrigerant may be admitted through the tube 27 and removed through the tube 26.

It will be apparent that when the coil is refrigerated below the freezing point, ice will form within, beneath and exteriorly of the same in a solid cake, and when the temperature of the coil is raised above the freezing point it will be freed from the ice so that it may be readily lifted out of the keg or container. In order to insulate the contents of the keg or container during the refrigeration cycle, a closure 28 is provided through which the tubes 26 and 27 extend through openings 29 and 30, the tubes having a tight fit in said openings.

The invention contemplates the use of a multiple unit refrigeration system with flexible connections attached to the inlet and outlet tubes 26 and 27 which allow the refrigeration coils 23 to be inserted into and removed from the kegs or containers. By using independent inexpensive refrigeration systems one of such systems can be located at a place of use and removed after refrigerating the keg or container.

In FIG. 1 is illustrated a refrigeration system for providing the necessary refrigeration of coils 23. This refrigeration system comprises a compressor 31 from which compressed refrigerant gas is discharged through a line 32, having a valve 33 therein, to a condenser 34. In the condenser the refrigerant gas is condensed or liquefied, and this liquid is allowed to pass into a header 35 and therefrom into one or more capillary tubes 36 (four of which are illustrated), and through the line 26 into the coil 23 to cause refrigeration of the contents such as the freezing of water 21 or other liquid. Refrigerant is withdrawn through the line 27 to a header 37 and then to the compressor. A valve 38 is located in each discharge line 27. The header 37 is connected by a line 39 containing a valve 40 with the compressor 31, thus during the refrigerant cycle, the valves 33, 38 and 40 are open and the refrigeration system can function in the usual manner, preferably subject to a temperature control 40'.

In order to make it possible to supply heat to one or more of the coils 23, the compressor is provided with a line 41 containing a valve 42, which line 41 connects to the header 37. The line 32 is provided with a return line 43 containing a valve 44, the line 43 being connected to the line 39 extending to the inlet side of the compressor.

After the refrigeration cycle, the cooling coil may be heated electrically or in any other conventional manner, ts by reversing the cycle. In order to reverse the refrigeration process so that the hot compressed gas will enter the refrigerating coil 23 to defrost or release the same from the ice formed within, beneath and around the same, the valves 33 and 40 are closed and the valves 42 and 43 are opened. The compressed gas will then flow through the line 41 into the header 37 through the coil 23 and through the line 26 and the capillary tube 36, as well as through the restrictor 45 to the header 35, and then through the condenser 34 and the lines 32 and 43 to the compressor. Within the restrictors 45 are mounted check valves 46 which permit flow therethrough only on the reverse or heating cycle.

By operation of the valves 38, one or more of the respective coils 23 may be selectively used and after the coils are supplied with heat and the ice released, the kegs or containers with the ice therein are removed from the coils and the kegs or containers placed and used at desired locations. Additional kegs or containers with water or the liquid to be refrigerated may be placed in position, whereupon the refrigerating cycle can be repeated by operation of the respective valves.

The invention contemplates refrigeration of the interior of a container by the utilization of cooling means within said container for a sufficient time to obtain the desired refrigerating effect and thereafter the separation of the cooling means from the container so that access may be had to the container to use the cooling effect after the cooling means has been removed. While the foregoing description is directed in a large part to circular refrigerating means and containers, it is not limited thereto but instead is intended to encompass a container of another configuration, as for example, an elongated container 47 in which is located cooling means 48 which may be generally in the same plane and in the general form of a flat plate which may include tubes or rods, extending from a cooling member 49 attached to a header 50 to which a refrigerant is supplied through a line 51 and removed through a line 52.

What is claimed is:

1. The combination of at least one container for drinking water to be dispensed over a prolonged period, and apparatus for freezing into a solid mass water to be drunk substantially filling said container, said apparatus including a cooling element, a major portion of which is adapted to be submerged in water in the container for freezing the water into a solid mass of ice, a portion of the cooling element which is adapted to be submerged having relatively smooth internal and external open-ended wall surfaces with such internal and external wall surfaces disposed parallel to the direction of movement of the cooling element when the latter is inserted into and removed from the container, whereby a minimum melting of ice is required to allow removal of said cooling element from ice frozen in said container, means for introducing hot medium into said cooling element to raise its surface temperature sufficiently to break the bond between said cooling element and the adjacent ice to allow separation of the cooling element and container, said cooling element being connected to said apparatus by supply and return lines of sufficient flexibility to allow ready assembly and disassembly of said cooling element and ice-filled container, and with one of said cooling element and container mobile to permit the disposition of said container with ice therein at a selected location while the other of said cooling element and container may be disposed at another location.

2. The invention as set forth in claim 1 in which said container has insulating walls and cover means when the cooling element is within the container and after the same has been removed.

3. The invention as set forth in claim 1 in which the construction is such that the refrigeration system may be transported to the container or the container transported to the refrigeration system.

4. The invention as set forth in claim 1 in which the means for heating the cooling element to free it from the ice formed about the same is by reversing the cycle of the refrigeration system.

5. The invention as set forth in claim 1 in which said cooling element is of substantially uniform cross-sectional configuration to permit its ready removal from ice frozen on both its interior and exterior within the container whereby the ice may be allowed to melt and the resultant liquid dispensed after the cooling unit has been removed.

6. The structure of claim 1 in which said cooling element is comprised of a coil of spiral convolutions disposed in overlying compact contact relation with relatively smooth inner and outer surfaces of substantially uniform diameter from end to end.

7. The structure of claim 1 in which said cooling element is comprised of a coil of spiral convolutions disposed in overlying compact contact relation with relatively smooth inner and outer surfaces of substantially uniform diameter from end to end and having a sleeve on its interior and another sleeve on its exterior with both of said sleeves in good metal to metal contact with said coil.

8. The invention as set forth in claim 1 in which said cooling element includes a tube folded upon itself into a helical coil with the liquid and suction lines at the same end of the helix.

9. The structure of claim 1 in which said container is provided with a valved discharge from its lower portion.

References Cited
UNITED STATES PATENTS

| | | | |
|---|---|---|---|
| 489,387 | 1/1893 | Muller | 62—448 |
| 1,051,296 | 1/1913 | Williams. | |
| 1,801,693 | 4/1931 | Ruff | 165—74 |
| 1,936,770 | 11/1933 | Pownall | 62—356 X |
| 2,440,397 | 4/1948 | Erickson | 165—74 X |
| 2,449,127 | 9/1948 | Kleist | 165—74 X |
| 3,380,261 | 4/1968 | Hendrix et al. | 62—138 |
| 2,676,468 | 4/1954 | Schlumbohm | 62—352 X |

WILLIAM E. WAYNER, Primary Examiner

U.S. Cl. X.R.

62—394, 448; 165—74